United States Patent Office 3,479,304
Patented Nov. 18, 1969

3,479,304
PREPARATION OF FLAME-RESISTANT FLEXIBLE FOAMS FROM HALOGENATED TOLYLENE DIISOCYANATE
Howard Emil Holmquist, Wilmington, Del., assignor to E. I. du Pont de Nemours and Company, a corporation of Delaware
No Drawing. Filed Mar. 31, 1966, Ser. No. 538,961
Int. Cl. C08g 22/46; C09k 3/28
U.S. Cl. 260—2.5                 1 Claim

ABSTRACT OF THE DISCLOSURE

A method for making flame-resistant polyurethane foam by mixing a polyalkylene ether polyol, water and an aromatic diisocyanate, which is a mixture of toluene diisocyanate and undistilled ring-halogenated tolylene diisocyanate, in the presence of urea and a catalyst containing tin.

---

This invention relates to a novel "one-shot" process for preparing flame-resistant flexible polyurethane foams.

The highly flammable nature of conventional flexible polyurethane foams limits their acceptance in many applications. Numerous attempts have been made to improve flame-resistance by the addition of a variety of liquid and solid agents, but the results have not been entirely satisfactory. Foam intermediates containing substituents which normally reduce the flammability of organic materials have been employed to avoid the difficulties associated with additives.

Ring-halogenated tolylene diisocyanate is a foam intermediate which has been suggested for improving the flame-resistance of polyurethanes. Unfortunately refined halogenated tolylene diisocyanates are expensive to produce because they are high boiling and must therefore be distilled at very low pressures. Further they are relatively high melting and as a result difficult to handle in the "one-shot" preparation of flexible polyurethane foam.

It has now been discovered that undistilled ring halogenated tolylene diisocyanate can be employed for the manufacture of flame-resistant foam. Accordingly the process of this invention can be defined as a method for making flame-resistant flexible polyurethane foam which comprises mixing substantially simultaneously (A) 100 parts by weight of a polyalkyleneether polyol having a number average molecular weight of 1000 to 5000, a hydroxyl number of 25 to 125 and an average of 2 to 4 hydroxyl groups per mole; (B) 1 to 5 parts by weight of water; (C) 0.9 to 1.2 equivalents of an organic diisocyanate per equivalent of active hydrogen supplied by (A) plus (B), said organic diisocyanate being a mixture comprising 100 parts by weight of undistilled ring-halogenated tolylene diisocyanate and 10 to 25 parts by weight of tolylene diisocyanate said mixture containing at least 20% halogen by weight, said halogen being chlorine, bromine or mixtures thereof; (D) 0.1 to 2.2 parts by weight of an catalyst containing tin; and (E) 1 to 5 parts by weight of urea.

The process of the present invention is similar in a broad sense to prior art "one-shot" processes for peparing flexible foams in that an aromatic diisocyanate is reacted with a polymeric polyol and water in the presence of catalysts. The present "one-shot" process for flame-resistant flexible foams differs from the art in the use of specific mixtures of undistilled halogenated tolylene diisocyanate and tolylene diisocyanate as the diisocyanate component and in the use of a novel combination of catalysts consisting of urea and an organo tin compound.

The diisocyanate mixture used in the present invention is obtained by adding 10 to 25 parts of tolylene diisocyanate to 100 parts of undistilled halogenated tolylene diisocyanate. The proportions of thte halogenated and unhalogenated diisocyanates and the degree or extent of halogenation of the halogenated tolylene diisocyanate must be selected so that the diisocyanate mixture contains at least 20% halogen. This is equivalent to a minimum of about 22.2% by weight of halogen in the halogenated tolylene diisocyanate itself. The halogen must be in the form of chloro- and/or bromo-substituents on the aromatic ring.

The required halogenated tolylene diisocyanate can be prepared essentially by the procedures outlines in U.S. Patents 2,915,545 and 2,945,875. Refined 2,4- or 2,6-tolylene diisocyanate or mixtures thereof can be employed as starting materials for the halogenation. A mixture of 80% 2,4-isomer and 20% 2,6-isomer is especially preferred. A preferred procedure for halogenating this mixture involves countercurrent contacting of the isomer mixture, containing about 1–3% of anhydrous ferric halide, with an excess of halogen in a bubble-cap or sieve plate tower reactor. The halogenation is conveniently carried out at about 100° C. The ferric halide catalyst is required to provide an acceptably rapid rate of halogenation. The reactor employed should have a large length/diameter ratio so as to provide a high gas velocity in the tower. The plates in the tower should be designed to provide a maximum amount of dispersion as gas passes through them into the liquid supported by the plates. Chlorination in this equipment is accomplished by feeding chlorine to the bottom of the reactor. Bromination may be performed economically with mixtures of bromine and chlorine. Isocyanate mixtures containing both chlorine and bromine substituents may be made by feeding chlorine to the bottom of the tower and bromine at a point one or more plates further up the tower.

Undistilled halogenated tolylene diisocyanates prepared from tolylene diisocyanate containing from 60–90% 2,4-isomer and 10–40% 2,6-isomer in which there is an average of about 1.4 to 1.9 gram-atoms of total halogen per mole, at least 50 mole percent of the halogen being bromine with the remainder being chlorine, are especially preferred. These materials contain a minimum of about 32% halogen. Because of their high halogen content, these diisocyanates yield foams exhibiting outstanding flame-resistance. At the same time, the preferred halogenated tolylene diisocyanates are relatively low melting which simplifies their use in foam preparation. These preferred materials are readily prepared by the continuous halogenation process described hereinbefore. While undistilled halogenated tolylene diisocyanates having compositions outside the limits specified for the preferred materials are useful in the present process, the preferred diisocyanates represent the best balance between the cost of halogenation, the melting point of the halogenated diisocyanate and the flame-resistance of the foams obtainable from halogenated tolylene diisocyanate. Before use in the present process, the "crude" or undistilled halogenated tolylene diisocyanate produced by the above-procedures must be heated at reduced pressure or in the presence of a stream of inert gas at 150 to 220° C. for a period of time ranging from several minutes to about 2 hours. The heating is believed to remove free or loosely bound hydrogen halides.

The tolylene diisocyanate which is mixed with the halogenated diisocyanate may be the 2,4-isomer, 2,6-isomer or mixtures thereof. The tolylene diisocyanate can be refined or can be the undistilled product resulting from the phosgenation of tolylene diamine.

The ratio of tolylene diisocyanate to halogenated tolylene diisocyanate in the diisocyanate mixture is critical. At least 10 parts of tolylene diisocyanate is required to insure that the mixture remain liquid during the preparation of foam. If more than 25 parts of tolylene diisocyanate are used, the concentration of halogen in the mixture is reduced needlessly and the resulting foams are more flammable.

Any of the polyalkyleneether polyols, including glycols, normally used to prepare conventional flexible polyurethane foams can be used in the present process. The polyalkyleneether polyols are obtained readily by condensing lower alkylene oxides with low molecular weight diols and polyols such as ethylene glycol, glycerol, propylene glycol, trimethylolpropane, triethanolamine and pentaerythritol. The glycols and polyols should have molecular weights ranging from 1000 to 5000 hydroxyl numbers of 25 to 125 and an average of 2 to 4 hydroxyl groups per mole. These limits are required to obtain satisfactory flexible foams. Polypropyleneether triols having a molecular weight of about 3000 are preferred. These can be used alone or mixed with polypropyleneether glycols of 1000 to 2000 molecular weight. The addition of minor amounts of low molecular weight (below 1000) glycols and polyols can be used to increase the proportion of halogenated diisocyanate mixture required in the present foam formulation which in turn raises the concentration of halogen in the foams produced.

From about 1 to 5 parts of water is employed for each 100 parts of polyalkyleneether polyol used. The water provides for expansion of the foam by carbon dioxide liberation. The urea linkages that are produced by the —NCO/water reaction are also essential in obtaining flexible foams having good physical properties. The amount of water used is dependent on the final density of foam desired. While not essential hydrocarbon and halohydrocarbon expanding agents may be employed in addition to water to expand the foams of this process. Preferred expanding agents are fluorine-containing halohydrocarbons such as trichlorofluoromethane, dichlorodifluoromethane and dichlorotetrafluoroethane.

The amount of diisocyanate mixture, polyol and water used should be adjusted so that the ratio of isocyanate groups to active hydrogens provided by both the polyol and water is about 1.05. This ratio can however vary from about 0.9 to 1.2. Greater amounts of diisocyanate are uneconomical. In addition, operation outside these limits yields foams of poor quality.

It is necessary to employ catalysts in praparing the "one-shot" foams of the present invention. However, the usual combination of tertiary amine and organo-tin catalysts is not satisfactory because of severe shrinkage of the foams so produced. Instead, urea plus compound containing tin must be used. From about 1 to 5 parts of urea per 100 parts by weight of polyalkyleneetherpolyol can be used. The urea is conveniently added in the form of a solution in the water required for preparing the foam. The organo-tin catalyst is used in amounts of about 0.1 to 2.2 parts per 100 parts by weight of polyalkyleneether polyol. Representative catalysts containing tin include stannous 2-ethylhexanoate, stannous oleate, dibutyltin dilaurate and dibutyltin di-2-ethylhexanoate.

In preparing foams by the process of this invention it is desirable to carry out the reaction of diisocyanate with polyol and water in the presence of a surfactant which contains mixed oxyethylene-oxypropylene copolymer blocks in the molecule. The surfactant serves to stabilize the foam during the formation and helps produce a more uniform final product. Several classes of surfactants which have previously been recognized as being useful for foam production have been found to be effective. These include (a) nonionic surface active agents prepared by sequential addition of propylene oxide and ethylene oxide to compounds such as ethylenediamine and propylene glycol, (b) polydimethylsiloxane-polyalkyleneether block copolymers which are subject to slow hydrolysis and (c) related polydimethylsiloxane-polyalkyleneether block copolymers which have been modified so as to be resistant to hydrolysis. Of these various types of surfactants, the polydimethylsiloxane-polyalkyleneether block copolymers which are resistant to hydrolysis are especialy preferred. The nonionic surface active agents which are prepared by sequential addition of polylene and ethylene oxides to compounds such as ethylenediamine and propylene glycol can be described by the following formulas:

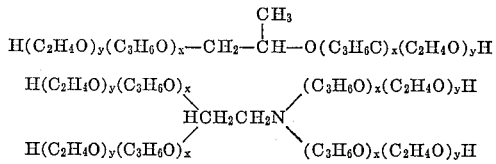

wherein $x$ equals the number of propylene ether groups and $y$ is the number of ethylene ether groups. Surfactants having molecular weights ranging from 1200 to 3000 and ratios of $x$ to $y$ of 1:1 to 7:1 are most suitable for use in the process of this invention. The polydimethylsiloxane-polyalkyleneether block copolymer surfactants which are subject to hydrolysis can be obtained by the process described in U.S. Patent 2,834,748. The block copolymer described in Example I($a$) of this patent is a preferred surfactant of this class for use in the present invention. However, related block copolymers can be used. Similar polydimethylsiloxane-polyalkyleneether block copolymers produced by processes such as those disclosed in Canadian Patent 669,881 and British 1,015,611 are especially preferred for use in the present invention. As previously mentioned, these surfactants are resistant to hydrolysis and present less difficulty in regard to handling. In preparing the flame-resistant foams of this invention, about 2–10 parts of any of the above types of surfactants may be used per hundred parts of polyol. With the water-soluble organo-silicone polymers which are resistant to hydrolysis, excellent results are obtained if about 5 parts of surfactants are employed per 100 parts of polyalkyleneether polyol.

The foams produced by the present process show a significant degree of flame-resistance relative to conventional foams without the addition of any other materials. However, the addition of antimony compounds markedly increase their flame-resistance and permits self-extinguishing foams to be prepared. Antimony trioxide, antimonate (III) esters of polyols and triaryl stibines are illustrative of the antimony compounds which may be used to enhance flame-resistance. The amount of antimony in the foams can be as much as 10% by weight. The preferred additive is antimony trioxide employed at levels which provide about 3 to 6% of antimony based on the weight of the finished foam. Other flame-proofing agents such as halogen-containing organic plasticizers and phosphorous-containing polyols may also be used in the foams of this process to increase flame-resistance.

This invention is further illustrated by the following specific examples.

EXAMPLES

The following diisocyanates are used in the examples.

Diisocyanate A

A sieve plate tower having an inside diameter of about 2 inches is used as a continuous reactor for halogenating tolylene diisocyanate. The tower has seven plates, each containing 114 holes (1/16 in. diameter) and a J-leg (3/8 in. inside diameter) through which the gas phase rises and the liquid phase descends respectively. The plates in the tower are 16 inches apart except for plates 5 and 6 (numbering from the top) which are 37 inches apart. The tower operates liquid-full. The spaces between plates are jacketed so that heating or cooling is possible to maintain the temperature.

When the tower is in use, 34 g./min. of a 1.48% solution of ferric chloride in tolylene diisocyanate (80% 2,4-isomer; 20% 2,6-isomer) is fed continuously to the top of the tower and 103 g./min. of the same solution is fed between plates 5 and 6 of the tower. Chlorine is introduced below plate 7 at a rate of 58 g./min. and bromine is introduced just below plate 6 at a rate of 102 g./min. The temperature is maintained at 100° C. Halogenated tolylene diisocyanate is removed through an overflow leg at the bottom of the tower. By-product gas consisting mainly of hydrogen chloride is discharged at atmospheric pressure from the top of the tower. After the material discharged from the tower has been heated at 200° C. for about 25 minutes at a pressure 10–20 mm. Hg it is ready for use. The product contains about 1.65 atoms of bromide/mole of halogenated tolylene diisocyanate and 0.17 atom of chlorine/mole of halogenated tolylene diisocyanate.

Diisocyanate B

The procedure used for preparing Diisocyanate A is followed, except the bromine feed rate is 100 g./min. and the chlorine feed rate is about 62 g./min. The product contains 1.61 atoms of bromine and 0.23 atom of chlorine per mole of halogenated tolylene diisocyanate.

Diisocyanate C

Tolylene diamine (80% 2,4-isomer; 20% 2,6-isomer) is dissolved in o-dichlorobenzene and phosgenated essentially by the procedure disclosed in U.S. Patent 2,822,373. Following the phosgenation, o-dichlorobenzene is removed by fractional distillation at reduced pressure. The undistilled polyisocyanate contains about 85% of volatile tolylene diisocyanates with the remainder being phosgenation by-products.

Diisocyanate D

Tolylene diamine (80% 2,4-isomer; 20% 2,6-isomer) is dissolved in o-dichlorobenzene and phosgenated essentially by the procedure disclosed in U.S. Patent 2,822,373. Following the phosgenation, o-dichlorobenzene and about half of the distillable diisocyanate are removed by fractional distilaltion. The undistilled portion of the polyisocyanate contains about 75% of volatile tolylene diisocyanates with the remainder being phosgenation by-products. The isocyanato group content of this polyisocyanate is about 37–38% by ASTM D 1638-60T.

Diisocyanate E

Distilled mixture of tolylene diisocyanate isomers; 80% 2,4- and 20% 2,6-isomer.

EXAMPLE 1

About 481 parts of a polyalkyleneether triol (molecular weight, about 3000; hydroxyl number 56) obtained by condensing propylene oxide with glycerol, 22.1 parts of a surfactant of the type described in Example 1 of Canadian 669,881, 34 parts of antimony trioxide, and 369.2 parts of a 90:10 mixture of Diisocyanate B and Diisocyanate C are weighed into an open container. The mixture of diisocyanates contains 36.9% by weight halogen. As rapidly as possible, 2.5 parts of stannous 2-ethylhexanoate, 13 parts of urea dissolved in 18.9 parts of water and 61 parts of trichlorofluoromethane are added to the container and all of the ingredients are agitated vigorously. When the mixture begins to thicken (about 10 seconds) it is poured into an open mold and allowed to foam. As soon as the foam is tackfree, it is placed in a 100° C. air oven and cured for 1 hour. Before testing it is allowed to age at room temperature for at least 40 hours.

The resilient foam contains 14.5% halogen and 3.0% antimony. Its density is 1.8 lb./cu.ft. Flammability is measured by the method of ASTM E–162. The results of this test are reported in terms of "Flame Spread Index." The foam of this example has an index of 209. Conventional polyurethane foam has an index of about 1400. For purposes of comparison, red oak wood has an index of about 100 and Masonite, about 120–150. The foam of this example does not drip when it is burned in marked contrast to conventional foam.

EXAMPLES 2–5

Example 2.—About 32 parts of the polyalkyleneether triol used in Example 1, 1.7 parts of a surfactant of the type described in Example 1 of Canadian 669,881 and 26.4 parts of an 80:20 mixture of Diisocyanate B and Diisocyanate E are weighed into an open container. The mixture of diisocyanate contains 32.8% halogen. As rapidly as possible, 0.7 part of stannous 2-ethylhexanoate, 1 part of urea dissolved in 1.5 parts of water and 5 parts of trichlorofluoromethane are added to the container and all of the ingredients are vigorously agitated. When the mixture beings to thicken, which requires about 30 seconds, it is poured immediately into an open mold and allowed to foam. After the foam is tack-free, it is cured for 1 hour at 100° C. in an air oven. Before testing, it is aged at room temperature for at least 40 hours. The finished foam contains 13.7% halogen. When tested for flammability by the method of ASTM D–1692, it is found to have a burning rate of 3.6 in./min. Conventional polyurethane foam exhibits a burning rate in excess of 7 in./min. in this test.

Examples 3–5.—A series of three foams is prepared by the procedure of Example 2 with the exception that 2.0, 4.0 and 6.0 parts of antimony trioxide are added to the initial mixture of polyol, surfactant and diisocyanate. The concentration of halogen and antimony in the final foams and test data from ASTM D–1692 are tabulated below in Table I. The foam of Example 2 is included for comparison.

TABLE I

| Example | Halogen, percent | Sb, percent | ASTM D-1692 | |
|---|---|---|---|---|
| | | | Burning Rate, in./min. | Self-Extinguishing |
| 2 | 13.7 | | 3.6 | No. |
| 3 | 13.3 | 2.6 | 1.7 | No. |
| 4 | 12.9 | 5.0 | 1.8 | Yes. |
| 5 | 12.5 | 7.2 | 1.7 | Yes. |

EXAMPLE 6

About 32 parts of the polyalkyleneether triol used in Example 1, 1.7 parts of the surfactant described in Example 1–A of U.S. Patent 2,834,748 and 29.0 parts of an 80:20 mixture of Diisocyanate A and Diisocyanate D are placed in an open vessel. This mixture contains 35.6% halogen. As rapidly as possible, 0.6 part of stannous 2-ethylhexanoate, 0.5 part of urea dissolved in 1.5 parts of water and 5 parts of trichlorofluoromethane are added. The mixture is agitated until it thickens and foaming and curing is effected as in Example 1. The resilient foam contains 15.8% halogen and has a burning rate of 3.1 in./min. by the method of ASTM D–1692.

When the procedure of this example is repeated using as the diisocyanate, 27.4 parts of an 80:20 mixture of Diisocyanate A and Diisocyanate E and 1.0 part urea rather than 0.5, a foam is produced which contains 15.0% halogen and has a burning rate of 2.9 in./min. by ASTM D–1692.

EXAMPLE 7

About 32 parts of the polyalkyleneether triol used in Example 1, 1.7 parts of the surfactant described in Example 1–A of U.S. Patent 2,834,748, 2.0 parts of antimony trioxide and 26.4 parts of an 80:20 mixture of Diisocyanate B and Diisocyanate E are placed in an open container. The diisocyanate mixture contains 32.8% halogen. As rapidly as possible, 0.5 part of stannous 2-ethylhexanoate, 1.0 part of urea dissolved in 1.5 parts of water and 5 parts of trichlorofluoromethane are added. The mixture is agitated vigorously until it thickens and foaming and curing is effected as in Example 1. The resilient foam produced contains 13.3% halogen and 2.6% antimony. It has a burning rate of 2.1 in./min. and is self-extinguishing by ASTM D-1692.

When this procedure is repeated with the exceptions that 0.2 part of stannous 2-ethylhexanoate is used and trichlorofluoromethane is omitted a self-extinguishing resilient foam having a burning rate of 1.3 in./min. is obtained. The halogen and antimony contents are essentially unchanged.

EXAMPLE 8

A mixture of 432.2 parts of the polyalkyleneether triol used in Example 1 and 26.3 parts of a polyalkyleneether tetrol (molecular weight about 740) obtained by reacting propylene oxide with pentaerythritol, 24.8 parts of the surfactant described in Example 1-A of U.S. Patent 2,834,748, 35 parts of antimony trioxide and 414.6 parts of a 90:10 mixture of Diisocyanate B and Diisocyanate C are placed in an open container. The diisocyanate mixture contains 36.9% halogen. As rapidly as possible, 2.6 parts of stannous 2-ethylhexanoate, 14.6 parts of urea dissolved in 21.2 parts of water and 63 parts of trichlorofluoromethane are added. The mixture is agitated vigorously and foaming and curing is effected as in Example 1.

The resilient foam produced has a density of 1.3 lb./cu.ft. Its halogen and antimony contents are 15.7% and 3.0% respectively. When tested by ASTM E-162, the Flame Spread Index is 195 and there is no dripping of burning material.

Many modifications of this invention will occur to one skilled in the art in the light of this disclosure, and it is to be understood that the scope of this invention is not to be limited except as set forth in the appended claim.

I claim:
1. A method for making flame-resistant flexible polyurethane foam which comprises mixing substantially simultaneously

(A) 100 parts by weight of a polyalkyleneether polyol having a number average weight of 1000 to 5000, a hydroxyl number of 25 to 125 and an average of 2-4 hydroxyl groups per mole;
(B) 1 to 5 parts by weight of urea in 1 to 5 parts by weight of water;
(C) 0.9 to 1.2 equivalents of an aromatic diisocyanate per equivalent of active hydrogen supplied by (A) plus (B), said organic diisocyanate being a mixture comprising 100 parts by weight of undistilled ring-halogenated tolylene diisocyanate having been heated to 150–220° C. for a time ranging from several minutes to two hours in the presence of a stream of an inert gas or at a reduced pressure and 10–25 parts by weight of tolylene diisocyanate, said mixture containing at least 20% halogen by weight, said halogen being chlorine, bromine or mixtures thereof;
(D) 0.1 to 2.2 parts by weight of a catalyst containing tin from the group consisting of a stannous 2-ethylhexanoate, stannous oleate, dibutyltin dilaurate and dibutyltin di-2-ethylhexanoate.

References Cited

UNITED STATES PATENTS

| | | | |
|---|---|---|---|
| 2,945,875 | 7/1960 | Tazuma | 260—453 |
| 2,975,146 | 3/1961 | Rogers et al. | 260—2.5 |
| 3,194,773 | 7/1965 | Hostettler | 260—2.5 |

FOREIGN PATENTS 1,379,500  10/1964  France.

DONALD E. CZAJA, Primary Examiner

M. B. FEIN, Assistant Examiner